US006493743B2

(12) United States Patent
Suzuki

(10) Patent No.: US 6,493,743 B2
(45) Date of Patent: Dec. 10, 2002

(54) PDA WORKSPACE INTERFACE USING APPLICATION ICONS FOR DOWNLOADING REMOTE USER FILE

(75) Inventor: Hideo Suzuki, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/142,431

(22) PCT Filed: Jan. 27, 1998

(86) PCT No.: PCT/JP98/00326

§ 371 (c)(1),
(2), (4) Date: Sep. 1, 1998

(87) PCT Pub. No.: WO98/33129

PCT Pub. Date: Jul. 30, 1998

(65) Prior Publication Data

US 2002/0007391 A1 Jan. 17, 2002

(30) Foreign Application Priority Data

Jan. 28, 1997 (JP) .............................................. 9-014199
Apr. 3, 1997 (JP) .............................................. 9-085281
Dec. 15, 1997 (JP) .............................................. 9-345211

(51) Int. Cl.⁷ .............................................. G06F 15/16
(52) U.S. Cl. ........................ 709/203; 709/220; 345/744; 345/745; 345/763
(58) Field of Search .............................. 709/201, 203, 709/221, 224, 220, 222, 229; 345/706, 708, 735, 744, 747, 749, 763, 764, 765

(56) References Cited

U.S. PATENT DOCUMENTS 5,305,435 A * 4/1994 Bronson ..................... 345/777
5,426,775 A * 6/1995 Boccon-Gibod ............. 714/36
5,497,484 A * 3/1996 Potter et al. ................. 707/200
5,566,291 A * 10/1996 Boulton et al. .............. 345/709
5,630,066 A * 5/1997 Gosling ....................... 709/221
5,742,829 A * 4/1998 Davis et al. ................... 717/11

(List continued on next page.)

FOREIGN PATENT DOCUMENTS

EP   0 572 332 A1   12/1993
EP   0 718 761 A1   6/1996
WO   WO 96/28778   9/1996

OTHER PUBLICATIONS

Windows NT 4 Workstation, Jacquelyn. Gavron and Joseph Moran, 1996.*
"Adding An Icon Corresponding to a Menu Item"; IBM Technical Bulletin, vol. 38, No. 8, Aug. 1, 1995; p. 553.
"The Network Computer—Intelligent Clients for the Age of Network Computing"; Database & Network Journal, vol. 26, No. 3, Jun. 1996, pp. 3–5.

Primary Examiner—Mehmet B. Geckil
Assistant Examiner—Beatriz Prieto
(74) Attorney, Agent, or Firm—Frishauf, Holtz, Goodman & Chick, P.C.

(57) ABSTRACT

In the network terminal device (200), the computer main body (202) transmits a download request containing user identification data to the host device (300) via a network (100) at the time of starting the terminal device (200). In the host device (300), of various types of files corresponding to the user identification data, a designated file which is set by the user table in advance, is selected from the user management file which stores various types of files corresponding to each and individual user, in reply to the download request, and the designated file is transferred to the network terminal device (200) which made the request. The designated file is a recently used data file.

6 Claims, 13 Drawing Sheets

U.S. PATENT DOCUMENTS

| | | | |
|---|---|---|---|
| 5,761,648 A | * 6/1998 | Golden et al. | 705/14 |
| 5,778,205 A | 7/1998 | Orimoto | |
| 5,818,446 A | * 10/1998 | Bertram et al. | 345/334 |
| 5,862,325 A | * 1/1999 | Reed et al. | 709/201 |
| 5,867,162 A | * 2/1999 | O'Leary et al. | 345/843 |
| 6,002,402 A | * 12/1999 | Schacher | 345/810 |
| 6,018,346 A | * 1/2000 | Moran et al. | 345/863 |
| 6,148,287 A | 11/2000 | Yamakita | |
| 6,161,140 A | 12/2000 | Moriya | |
| 6,327,623 B2 | * 12/2001 | Watts | 709/229 |

* cited by examiner

| USER IDENTIFICATION DATA | DATA FILE FOR INITIAL DOWNLOAD SETTING | APPLICATION FOR INITIAL DOWNLOAD SETTING |
|---|---|---|
|  |  |  |
|  |  |  |
|  |  |  |

| DOWNLOAD TIME | DOWNLOAD DATA FILE | DOWNLOAD APPLICATION | DELETE APPLICATION |
|---|---|---|---|
| 8 O'CLOCK |  |  |  |
| 12 O'CLOCK |  |  |  |
| 18 O'CLOCK |  |  |  |

PDA WORKSPACE INTERFACE USING APPLICATION ICONS FOR DOWNLOADING REMOTE USER FILE

TECHNICAL FIELD

The present invention relates to a data processing terminal device capable of accessing a host device via a communication network, downloading a variety of files, and executing data processing.

BACKGROUND ART

This application is based on Japanese Patent Application No. 9-14199, filed Jan. 28, 1997, Japanese Patent Application No. 9-85281, filed Apr. 3, 1997 and Japanese Patent Application No. 9-345211, filed Dec. 15, 1997, the content of which is incorporated herein by reference.

Recently, in many companies, personal computers have become essential tools in order to enhance the informatization, and it is becoming very usual that each one of the staff owns his/her own personal computer. Further, LAN, (Local Area Network) which serves as a computer network designed to improve the efficiency of the work by summarizing and sharing data obtained from the distributed works each done by a different staff, is rapidly becoming popular.

However, at the same time, for the formatization within a company, it is, in many case, the case that a desired target work environment or efficiency cannot be always-easily achieved due to widely dispersed computer-operating skills of individual company staffs, who actually operate the personal computers, or the lack of utilization of the software applied to the personal computers. This is because in a LAN consisting of personal computers, each individual personal computer is not an exclusive terminal optimized as a terminal device for the informatization system of the company, and therefore individual staffs are required to be familiar with some knowledge on the personal computer, and to have an operational sense, but the amount of knowledge and the operational sense may differ from one individual to another.

Further, in the case where a LAN is made up of a great number of personal computers, the load on the system manager is increased each time a version-up of a software is made. As a version-up of a software progresses, it becomes more possible that the operator's erroneous operation easily occur.

Under these circumstances, recently, network computers (to be abbreviated as NC hereinafter) whose processing functions are limited, have been proposed as terminals used to make up an informatized network such as LAN within a company, in order to facilitate the maintenance of the terminal device while reducing the processing load on the terminal. An informatized network (for example, LAN) employing such an NC, has communication functions of accessing an intra-company server via an exclusive line and accessing a server of a communication service company via a public line. Further, such a network has processing functions of providing a variety of types of processing environment obtained by downloading the programs of a variety of types of software stored in these servers, via the respective communication lines, and saving and maintaining the result of a process obtained by processing data with an NC, in a server side.

As described above, the NC has relatively simplified data processing functions capable of downloading a variety of types of application programs which are batch-managed by a server, in accordance with necessity, and processing a downloaded program, in addition to the function as a client in the conventional client-server type data processing system. Thus, the object is to realize the hardware structure of NC at low cost as compared to that of the conventional personal computer. Further, the object of an informatized network which employs such an NC is to reduce the system cost of the informatized network by carrying out the management and maintenance of application programs in a batch on the server side, so that the NC side is not required to do the management and maintenance of the application programs.

Further, mobile data processing terminals, including communication functions accessible to intra-company LANs or public network services, and designed mainly for processing personal information, are becoming popular, and one of the examples of such mobile data processing terminal is called PDA (personal digital assistant). The PDA is capable of accessing the intra-company server via an exclusive line, from outside, or accessing the server of the communication service company via a public line so as to send and/or receive data to and/or from the server, and the object of the PDA is to process data or save data to assist the work of the user.

However, in PDAs of the recent type, the communication functions and data processing functions are enhanced, and such PDAs can be applied even to the processing of application programs which conventionally can be dealt only with personal computers. Therefore, it is presently becoming possible with a PDA to conduct a data processing operation similar to that of the above-described NC, that is, the user of the PDA can connect it to a telephone line from outside, to access the server, and download an application program from the server to carry out a data processing.

As described above, the conventional NC has been proposed as an exclusive terminal device for the informatized network, to carry out the operation to access the server when necessary, and to download an application program file from the server, so as to realize an easy data processing function. However, a series of operations for communication, carried out when downloading the application program file from the server, are laborsome to the user, and in order to start an application, the operation of communication to access the server must be always conducted, thus complicating the starting operation for using an application program, and lowering the operability for the user.

The high level function PDA has the merit that the data processing functions similar to those of an NC can be utilized even outside; however a series of communication operations for downloading an application program file are troublesome to the user, thus complicating the starting operation for using an application program, and deteriorating the operability for the user.

DISCLOSURE OF INVENTION

The object of the present invention is to provide a data processing apparatus capable of downloading a necessary file from the host device connected via a communication network and immediately carry out the process of the downloaded file.

According to the present invention, there is provided a network terminal device adapted to be connected to a host device, comprising memory means for storing files; means for displaying indication items for specifying the files, on a display screen; means for selecting a desired indication item from the indication items displayed on the display screen; means for determining whether or not a file corresponding to the indication item selected by said selecting means is stored in said memory means; means for downloading the file corresponding to the indication item selected by said selecting means from the host device to the memory means, when it is determined by said determining means that the file is not stored; and processing means for executing a process based on the file downloaded by said downloading means.

Further, according to the present invention, there is provided a network terminal device adapted to be connected to a host device, comprising means for requesting transmission of data in connection with files stored in the host device, to the host device; means for acquiring file indication data transmitted from the host device, in response to the data request; means for displaying indication items based on the file indication data acquired by said acquiring means, on a display screen; means for selecting a desired indication item from the indication items displayed on the display screen; and means for downloading the file corresponding to the indication item selected by said selecting means, from the host device.

According to the present invention, in the case where a desired indication item is selected from a plurality of indication items displayed on the display screen, and a file corresponding to the selected indication item is not stored in the memory means, a file corresponding to the selected indication item is downloaded automatically from the host device. Therefore, the process of the file can be immediately carried out.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

BEST MODE OF CARRYING OUT THE INVENTION

Embodiments of the present invention will now be described in detail with reference to accompanying drawings.

First Embodiment

FIGS. 1 to 8D show the first embodiment of the network applicable type mobile terminal to which the data processing apparatus and storage medium of the. present invention are applied.

First, the structure of the embodiment will now be described.

Figure 1:
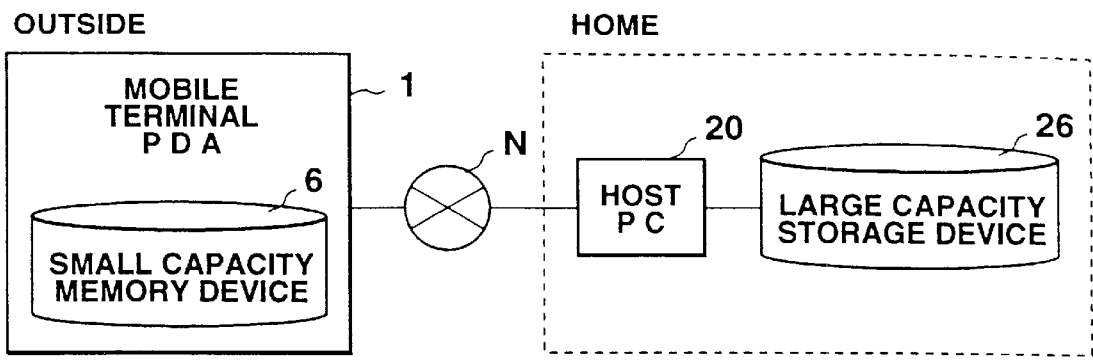
FIG. 1 is a diagram showing the entire structure of an information network which utilizes a network applicable PDA to which is a first embodiment of the data processing apparatus of the present invention.

FIG. 1 is a diagram showing the entire structure of an information network system in which a network applicable type mobile terminal 1 (to be abbreviated-as PDA 1 hereinafter) of the embodiment is utilized.

In the above-described information network system, the PDA 1 which is brought outside and a host PC (personal computer) 20 installed at home are connected to each other via a communication network N. The host PC 20 is accessed by the PDA 1 via the communication network N, and an operational environment such as icon data of an application program file set to the host PC 20, is downloaded so as to set an operational environment similar to that of the host PC 20, to the PDA 1 and enable the selection of an application on the same operational environment.

The host PC 20 stores operational environment information such as icon data of an application program file, and a variety of application program files to a large capacity storage device 26 in advance, and transmits the operational environment information and an application program file to the PDA 1 upon a request from the PDA 1.

Figure 2:
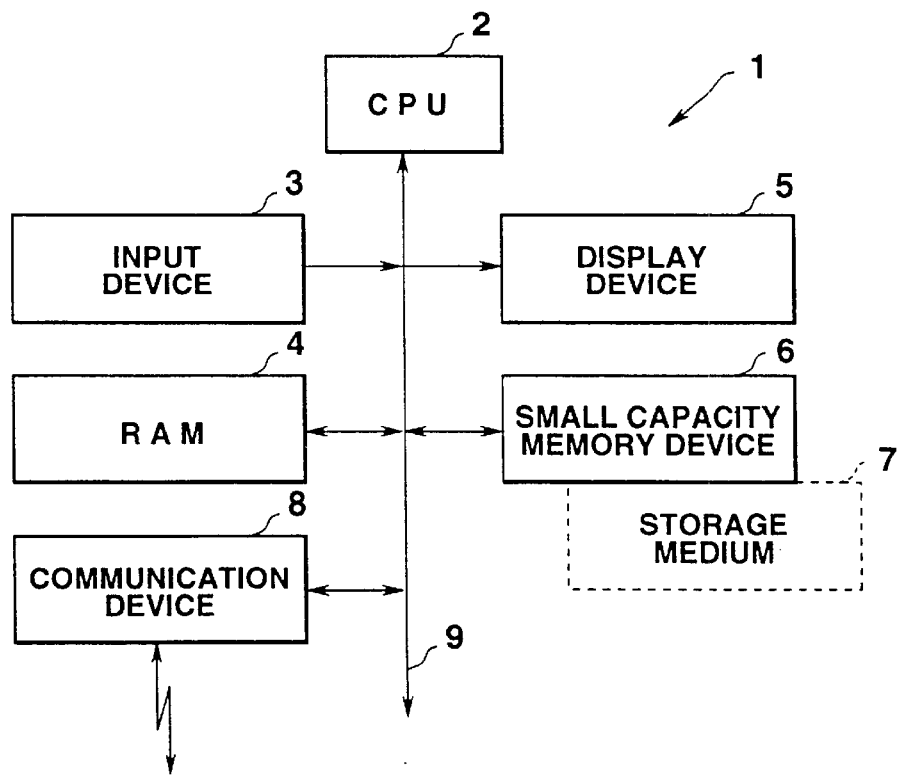
FIG. 2 is a block diagram showing the structure of the main section in the PDA shown in FIG. 1.

FIG. 2 is a block diagram showing the structure of the essential part within the PDA 1. The PDA 1 consists of a CPU 2, an input device 3, a RAM 4, a display device 5, a small capacity memory device 6, a storage medium 7 and a communication device 8, and all of these members except for the storage medium 7 are connected to a bus 9.

The CPU (central processing unit) 2 executes the initialization of data in the PDA 1 and the setting of a basic environment by the OS (operating system) program stored in advance in the small capacity memory device 6. Then, the CPU 2 is connected to the host PC 20 via the communication network N and thus the PDA process, which will be explained later, is executed. Further, a request for downloading all menu data is transmitted to the host PC 20, so as to download all the necessary data for displaying the menu from the host PC 20. At the same time, the application program file corresponding to the application icon is downloaded, and stored in the small capacity memory device 6. After that, menu image containing the application icon, data file icon and the like is displayed on the display device 5, and a series of processing steps for starting the application is automatically executed.

Further, the CPU 2 executes ordinary processing steps, which will be explained later, and displays a menu image on the display device 5 on the basis of all the menu data stored in the small capacity memory device 6 as downloading from the host PC 20 via the communication device 8 in the above-described PDA process. Then, an application program file or data file which is designated from those within the menu image is downloaded from the host PC 20 by the communication device 8 and stored in the small capacity memory device 6, and thus designated application program file is started to be executed. Subsequently, the CPU 2 stores different types of instructions or data input from the input device 3 in the RAM 4, and thus different types of processing are executed on the basis of the application program file or input data stored in the small capacity memory device 6 in accordance with the input instruction and input data. Then, the result of the process is displayed on the display device 5, and transferred to the host PC 20 via the communication network N to be stored.

The input device 3 includes a cursor key, numeral input keys, different types of function keys and the like, and a key-in signal of a pressed key is output to the CPU 2. The RAM (random access memory) 4 provides a memory area which temporarily stores programs and data to be processed by the CPU 2. The display device 5 is made of a liquid crystal display panel or the like, and displays data input from the CPU 2 and displays a menu image or the like, set for the PDA process executed by the CPU 2.

The small capacity memory device 6 includes a storage medium 7 having a memory capacity of about 300 MB (mega byte) as an area usable for application program files and data files excluding an area used by the OS program file. The memory device 6 contains only the OS program file in advance, and serves to store application program files, data files and the like, downloaded from the host PC 20 in the PDA process by the CPU 2 as described above. The storage medium 7 is made of a magnetic or optical storage medium, or a semiconductor memory, and it may be fixedly or detachably provided for the small capacity memory device 6.

It is also possible that programs, data and the like, to be stored in the storage medium 7 are received from other device than the host PC 20, which is connected via the communication network N by the communication device 8, or it is further possible that a memory device storing the above programs, data and the like is provided for the other device connected via the communication network N, and programs and data stored in the memory device in the other device are used via the communication network.

The communication device 8 has a connector detachable and connectable to the communication network N, and this device 8 is used to execute the communication process for downloading menu data, application program files, data files and the like, with respect to the host PC 20 in accordance with different types of communication commands instructed by the CPU 2 in the above ordinary process or PDA process.

Figure 3:
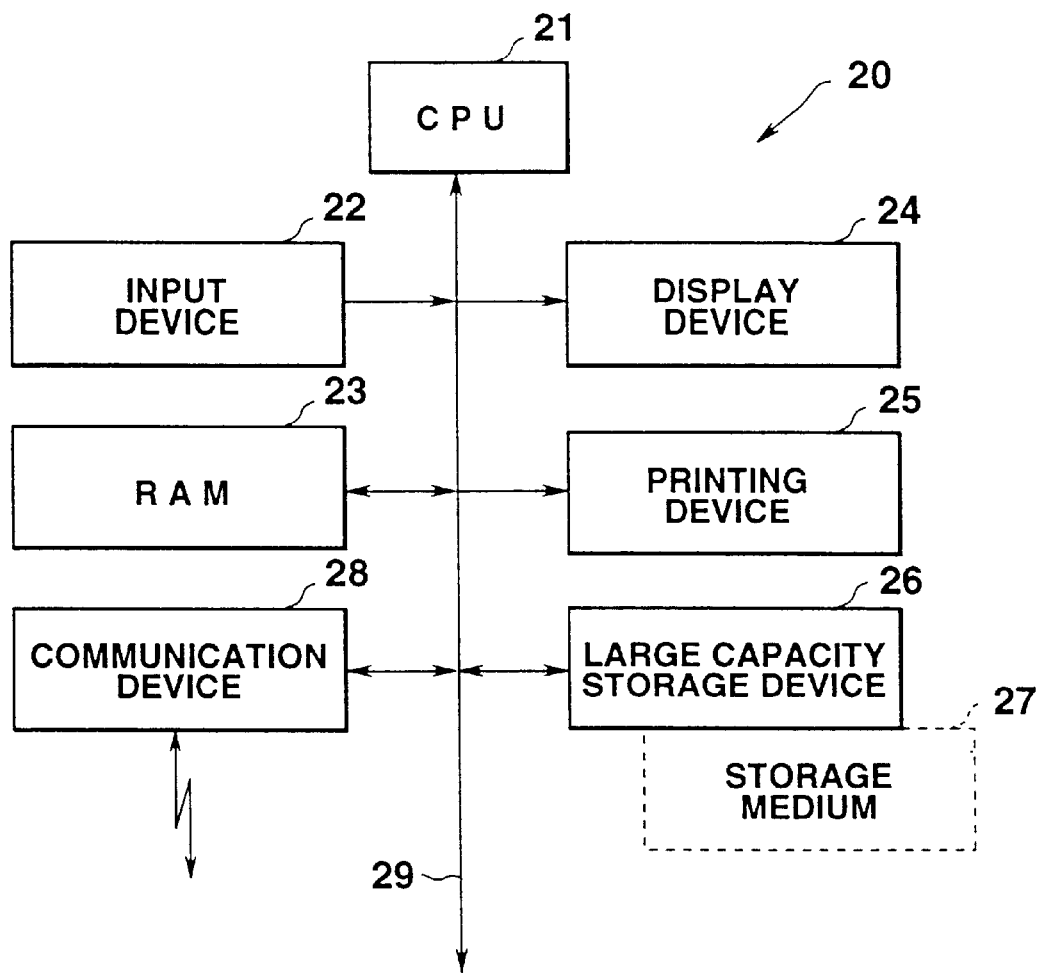
FIG. 3 is a block diagram showing the structure of the main section in the host device shown in FIG. 1.

FIG. 3 is a block diagram showing the structure of the essential part within the host PC 20 shown in FIG. 1. The host PC 20 consists of a CPU 21, an input device 22, a RAM 23, a display device 23, a printing device 25, a large capacity storage device 26, a storage medium 27 and a communication device 28, and all of these members except for the storage medium 27 are connected to a bus 29.

In order to make the host PC 20 to serve as a host computer in reply to various types of requests received by the communication device 28 from the PDA 1, the CPU 21 executes host PC processing steps, which-will be explained later, and stands by for the reception of the process request signal from the PDA 1. For example, when a request signal for downloading the menu data is received from the PDA 1, all the menu data stored in the large capacity storage device 26 are read out and transmitted to the PDA 1. When a request signal for downloading the application program files is received from the PDA 1, the application program files stored in the large capacity storage device 26 are read out and transmitted to the PDA 1. When a request signal for downloading the file data is received from the PDA 11 the file data stored in the large capacity storage device 26 are read out and transmitted to the PDA 1.

In order to make the host PC 20 operate as a personal computer, the CPU 21 stores an OS program in the large capacity storage device 26, which is similar to that stored in the PDA 1, and application program files designated in accordance with the system, in a program storage area (not shown) in the RAM 23, and further stores various types of instructions or data input from the input device 22 in the RAM 23. These processes are executed on the basis of the application program stored in the large capacity storage device 26 in response to the input instructions and input data, and the process results are stored in the RAM 23 and displayed on the display device 24. Further, the processing results stored in the RAM 23 are stored in a storage area within the large capacity storage device 26, which is instructed from the input device 22.

The input device 22 includes a cursor key, numeral input keys, different types of function keys and the like, and a key-in signal of a pressed key is output to the CPU 21. The RAM 23 provides a memory area which temporarily stores programs and data to be processed by the CPU 21. The display device 5 is made of a CRT (cathode ray tube) or the like, and displays data input from the CPU 21 and displays a menu image, and processing contents of different application program files, processed for the host PC process executed by the CPU 21. The printing device 25 prints out printing data input from the CPU 21, on a predetermined printing sheet.

The large capacity storage device 26 includes a storage medium 27 having a memory capacity of about 3 GB (giga byte) capable of storing all of the application program files and data files set by the user, in its area except for that used by the OS program. The storage medium 27 is made of a magnetic or optical storage medium, or a semiconductor memory, and it may be fixedly or detachably provided for the large capacity storage device 26. The memory device 27 serves to store the system program, different types of application program files corresponding to the system, communication process program, communication state memory process program, timer process program, data processed by these processing programs, and the like.

It is also possible that programs, data and the like, to be stored in the storage medium 27 are received from other device which is connected via the communication network N or the like, or it is further possible that a memory device storing the above programs, data and the like is provided for the other device connected via the communication network, and programs and data stored in the memory device are used via the communication network.

The communication device 28 has a connector detachable and connectable to the communication network N, and this device is used to execute the communication process for downloading menu data, application program files, data files and the like, with respect to the PDA 1 in accordance with different types of requests issued from the PDA 1 in the above ordinary process or host PC process.

The operation of the embodiment will now be described.

First, the PDA process and the ordinary process executed by the CPU 2 of the above-described PDA 1 will be described with reference to the flowchart illustrated in FIGS. 4 and 5.

Figure 4:
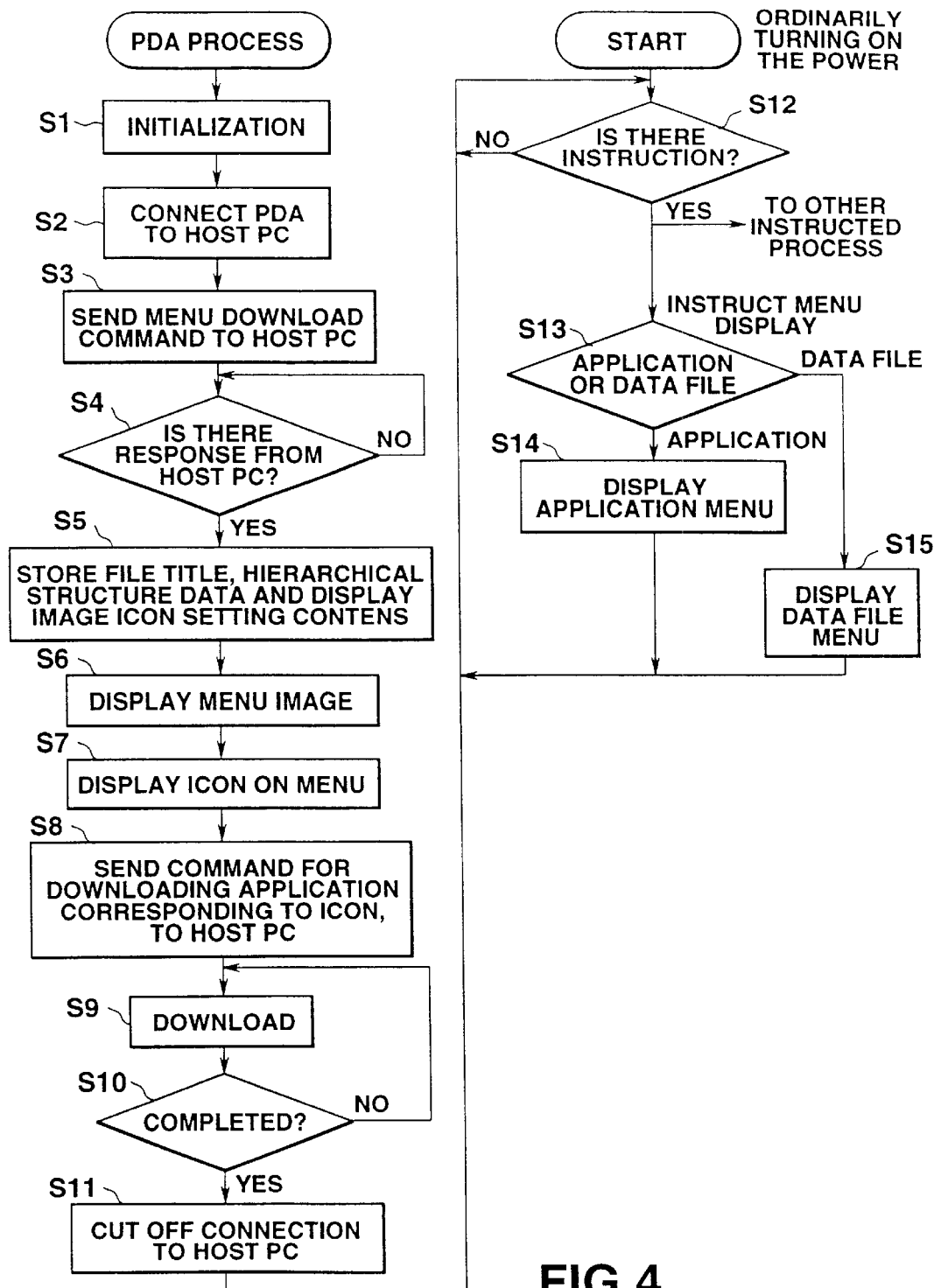
FIG. 4 is a flowchart illustrating the PDA processing executed by the PDA, and part of the ordinary processing.
Figure 5:
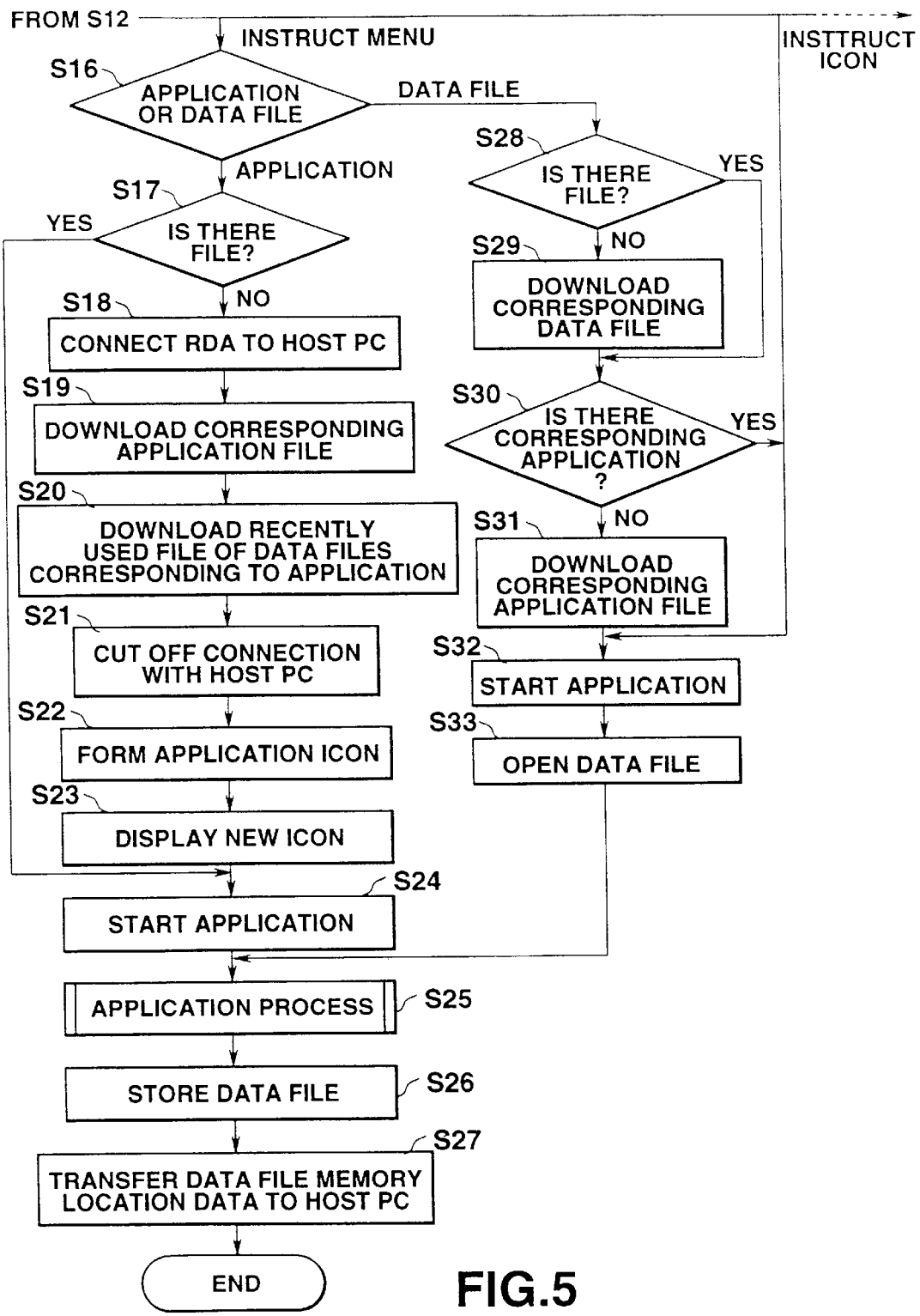
FIG. 5 is a flowchart illustrating other part of the ordinary processing, which follows FIG. 4.

In the initial stage before starting an access to the host PC 20, the PDA 1 stores only the OS program file in the small capacity memory device 6, and when the PDA process as shown in FIG. 4 is started from this state, the initialization of the respective members of the PDA 1 is carried out on the basis of the OS program (step S1).

Next, a preset communication protocol is executed by the communication device 8, and the PDA 1 is connected to the host PC 20 via the communication network N (step S2). Then, a menu download command is sent to the host PC 20 (step S3). It is determined whether or not there is a response from the host PC 20, to the menu download command (step S4). In other words, it is determined whether or not all the menu data for displaying the menu image set in the host PC 20, on the PDA 1, are received.

In reply to the menu download command, the host PC 20 retrieves and extracts all the application program files stored in the host PC 20 and the file titles of all the data files which have linkages to these application program files and transfers all the extracted file titles, the information of the hierarchical structure of the files (directory data), display screen setting contents (the contents of background, wall paper, screen saver and the like), the icon setting contents (data of the application icons of the application program files, which are displaced of the display image as icons) and the like, to the PDA 1 together with the response.

Further, upon confirmation of the reception of all the file titles, the file hierarchical structure data, and all the menu data containing the display image/icon setting contents, transferred from the host PC 20 together with the response, the PDA 1 stores all the menu data in the small capacity memory device 6 (step S5), and forms a menu image on the basis of the display image setting contents and icon setting contents, to be displayed on the display device 5 (steps S6 and S7). For an application displayed as an icon on the menu image, in order to enable the immediate start of the application, an command for downloading the application program file which corresponds to the icon is sent to the host PC 20 by the communication device 8 (step S8). Then, the download of the application program file transferred from the host PC 20, in reply to the command for downloading the application program file, is started (step S9). When the completion of the download of the entire application program file is determined (step S10), the downloaded application program file is stored in the small capacity memory device 6 and then the communication network N connected to the host PC 20 by the communication device 8 is cut off (step S11).

In the state where the setting process for the display image and the download process of the, application program file corresponding to the icon are completed, the step proceeds to the ordinary process from the step S12. At this time, various instructions from the user can be input from the input device 3 of the DPA 1. Further, when there is a menu display instruction (application menu or data file menu) (step S13), the corresponding file titles are displayed on the menu image in accordance with the hierarchical structure of the file titles (steps S14 and S15).

When a desired menu item in the application menu image is selected (step S16), and the corresponding application program file is stored in the small capacity memory device 6 (step S17), the step proceeds to step S24 where the application program file is read. out and developed in the RAM 4 so as to start it immediately, thus executing the application process (step S25).

If the corresponding application program file is not stored in the small capacity memory device 6, the connection to the host PC 20 is made via the communication network N by the communication device 8 (step S18). Thus, the corresponding file is downloaded from the host PC 20 (step S19) and further recent data files (for example, at least three files) of those corresponding to the application program file are downloaded (step S20). After the application program file and the data files downloaded are stored in the small capacity memory device 6, the communication network N connected to the host PC 20 by the communication device 8 is cut off (step S21).

As the application program file corresponding to the icon is stored in the small capacity memory device 8, the icon of the application is formed (step S22), and thus formed new icon is displayed in the menu image (step S23). Then, the designated application is started (step S24), and the step proceeds to the application process (step S25). The file data newly formed or updated as processed by the application process (step S25) are stored at a desired location in the hierarchical structure in the small capacity memory device 6 (step S26), and the file data and the location data of the hierarchical structured file data are transferred to the host PC 20 so as to update the memory contents of the host PC 20 (step S27), thus finishing this process.

As the file data processed by the application process is transferred to the host PC 2 as well, the file environments for the PDA 1 and the host PC 20 can be made the same.

In the case where a data file menu item is selected from the menu items in the menu image in step S16, it is determined whether or not the corresponding data file is stored in the small capacity memory device 6 (step S2). In the case where the corresponding data file is stored, it is determined whether or not the application program file corresponding to the data file is stored in the small capacity memory device 6 (step S30). If the corresponding application program file is stored, the application is started (step S32) and the corresponding data file is opened (step S33) so as to immediately starting the application process.

In the case where the corresponding data file is not stored in step S28, the PDA 1 is connected to the host PC 20 by the communication device 8 with the communication network N, so as to download the corresponding date file from the host PC 20 (step S29). In the case where the corresponding application program file is not stored in step S30, the PDA 1 is connected to the host PC 20 by the communication device 8 with the communication network N, so as to download the corresponding application program file from the host PC 20 (step S31). Then, after the data file and the application program file downloaded are stored in the small capacity memory device 6, the communication network N connected to the host PC 20 by the communication device 8 is cut off. Then the downloaded application is started (step S32), and the downloaded data file is opened (step S33) so as to immediately start the a application process.

Next, the step proceeds, to step S25 in which file data is newly formed or updated by the application process. The file data newly formed or updated as processed by the application process (step S25) are stored at a desired location in the hierarchical structure in the small capacity memory device 6 (step S26), and the file data and the location data of the hierarchical structure file data are transferred to the host PC 20 so as to update the memory contents of the host PC 20 (step S27), thus finishing this process.

Next, the host PC process executed by the CPU 21 of the host PC 20 will now be described with reference to the flowchart shown in FIG. 6.

Figure 6:
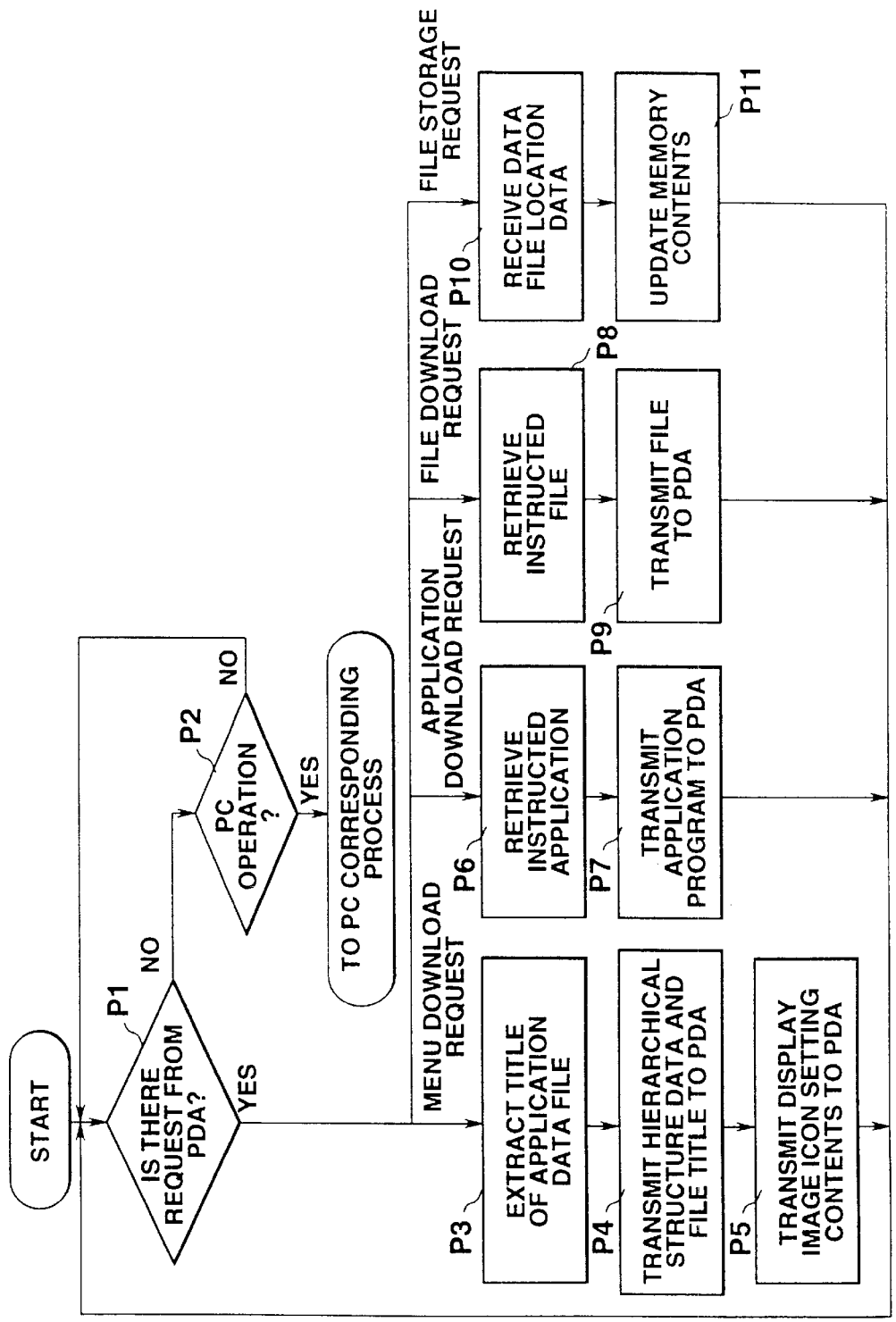
FIG. 6 is a flowchart illustrating a host PC processing executed by the host PC.

As can be seen in FIG. 6, when the CPU 21 starts the process using the host PC as a host PC, it is determined whether or not any request signal is received from the PDA 1 by the communication device 28 (step P1). In the case where there is no request signal received from the PDA 1, it is determined whether or not there is a PC operation from the input device 22 (step P2). In the case where there is no PC operation, the step goes back to step P1, whereas if there is a PC operation, the step proceeds to the process corresponding to PC.

In the case where there is a request command signal received from the PDA 1 and the content of the request command is the "menu download request command" all the application program files stored in the large capacity storage device 26 and the file titles of all the data files which have linkages to these applications are retrieved and extracted (step P3). Then, all the file titles extracted, the information of the hierarchical structure of the files (directory data), display image setting contents (the contents of background, wall paper, screen saver and the like), the icon setting contents (data of the application icons of the application program files, which are displayed on the display image as icons) and the like, are transferred to the PDA 1 together with a response (steps P4 and P5), and the step moves back to step P1.

In the case where there is a request command signal received from the PDA 1 and the content of the request command is the "application download request command", the designated application program file is retrieved and extracted (step P6). Then, the application program file extracted is transferred to the PDA 1 (step P7), and the step moves back to step P1.

In the case where there is a request command signal received from the PDA 1 and the content of the request command is the "data file download request command", the designated data file is retrieved and extracted (step P8). Then, the application program file extracted is transferred to the PDA 1 (step P9), and the step moves back to step P1.

In the case where there is a request command signal received from the PDA 1 and the content of the request command is the "file storage request command", the data file and the location data of the hierarchical structure for storing the data file are received from the PDA 1 (step P10). Then, the contents of the data file stored at the corresponding location of the hierarchical structure in the large capacity storage device 26 are updated in accordance with the location data (step P11), and the step goes back to step P1.

As described above, the PDA 1 of this embodiment executes the initialization and the basic environment setting according to the OS program, and then it is connected to the host PC 20 via the communication network N so as to carry out the PDA process. That is, a request command for downloading all the menu data is sent to the host PC 20, and all the application program files corresponding to the application icon are downloaded, to be stored in the small capacity memory device 6. After that, the menu image containing the application icon, the data file icon and the like is set and displayed on the display device 5, and a series of processing steps for enabling the start of an application are automatically carried out. Therefore, the user of the PDA 1 can skip the communication operation for manually downloading the application program files and data files from the host PC 20.

Figure 7A:
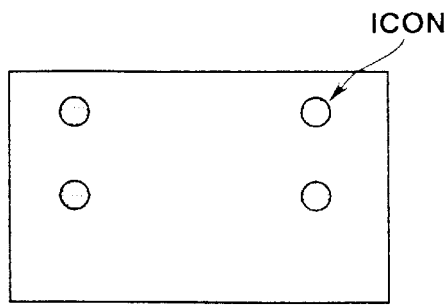
FIGS. 7A and 7B are diagrams showing display examples of the host PC.
Figure 7B:
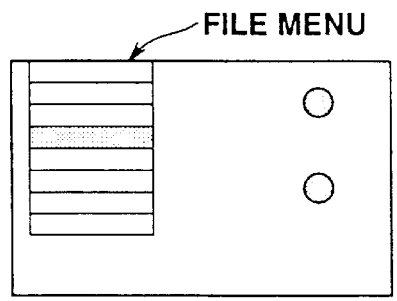

FIGS. 7A and 7B show display screen images of the host PC 20, and more specifically, FIG. 7A illustrates a state in which four icons which are arbitrarily set by the operator are displayed on the display screen, and FIG. 7B illustrates a state in which a menu of a number of files (that is, application menu or data file menu) is displayed on the display screen shown in FIG. 7A.

Figure 8A:
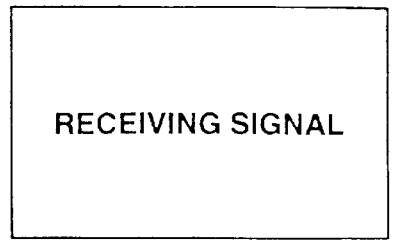
FIGS. 8A to 8D are diagrams showing display examples of the host PC.
Figure 8B:
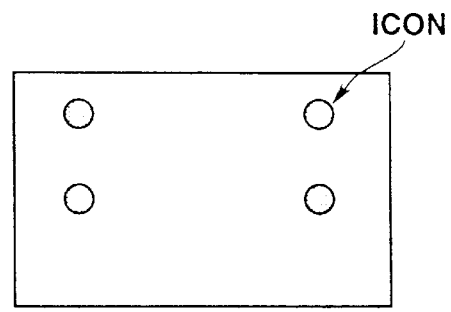
Figure 8C:
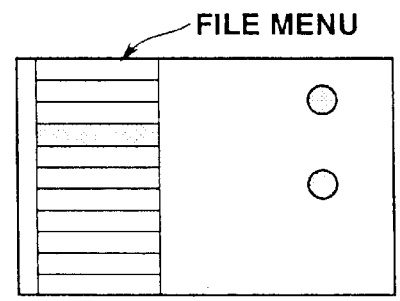
Figure 8D:
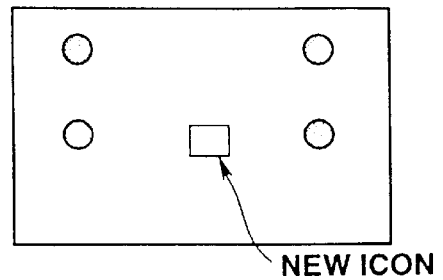

FIGS. 8A to 8D show display screen images of the PDA 1, and more specifically, FIG. 8A illustrates a display state in which all the necessary data for reproducing the status of the host PC 20 are received as the PDA process is started in order to reproduce the status of the host PC 20, FIG. 8B illustrates a display state after receiving all the data in FIG. 8A, FIG. 8C illustrates a state in which a menu of a number of files (that is, application menu or data file menu,) is displayed on the display screen shown in FIG. 8B, and FIG. 8D illustrates a state in which a new icon is formed and displayed after a desired file is selected in FIG. 8C.

As described above, in the PDA 1, the same operational environment as that of the host PC 20 can be reproduced by forming a menu image from the menu data downloaded from the host PC 20. Therefore, it becomes possible for the user to be able to operate an application program file or data file at a place away from home, in the same operational environment as that of home, and therefore the operational efficiency at the place outside can be improved.

Further, in the menu display formed in the PDA 1, the icon of a file menu is displayed under the same file title as that set for the menu image of the host PC 20, and therefore the file operation can be carried out in the same operational environment as that of the host PC 20. Also, in the menu display formed in the PDA 1, the image setting contents and icon setting contents similar to those set for the menu image of the host PC 20 are displayed, and therefore the file operation with the PDA 1 can be carried out in the same operational environment as that of the host PC 20.

In the PDA 1, when the application selected on the menu image is already stored in the small capacity memory device 6 of the PDA 1 itself, the process for downloading the application program file is omitted, and the step proceeds immediately to the start of the application. Thus, an unnecessary downloading process can be avoided, and therefore the processing efficiency in the PDA 1 can be improved.

On the other hand, when the application program file corresponding to the application icon selected on the menu image is not stored in the small capacity memory device 6 of the PDA 1 itself, the following operations are automatically carried out, that is, the host PC 20 is accessed so as to download the corresponding application program file, and the application is thus started. Therefore, in the application starting process of the case where an icon-corresponding application is selected, the user can skip the operation for downloading a not-yet registered application program file from the host PC 20.

Further, according to the structure of this embodiment, in the process of downloading the icon-corresponding application program file, the data file corresponding to the application is also downloaded, and when the application is started, the data file is also immediately opened. Therefore, it becomes possible for the user to carry out the process of the data file immediately after the icon-corresponding application thus downloaded is started, and the data processing efficiency can be improved.

Further, the icon-corresponding application downloaded from the host PC 20 is displayed in the form of icon in the menu screen so that it can be identified, and therefore the user can easily identify an application downloaded from the host PC 20.

In the PDA 1, when a data file menu is selected on the displayed menu screen, the following operation is automatically carried out. That is, the host PC is accessed so as to download the corresponding data file, and further the application program file having a linkage to the data file is also downloaded. Therefore, the download operation for a data file which is not stored in the PDA 1 and the application corresponding to the data file can be omitted. As a result, the operability for the process of a data file can be improved.

Further, in this embodiment, the starting of the an application and the opening of a data file are carried out immediately after downloading the data file and the application program file, and therefore the operability of the steps up to the point where the application process for the downloaded data file is started, can be improved.

Furthermore, in this embodiment, when the data file selected on the menu image and the linking application program file are already stored in the small capacity memory device 6 of the PDA 1 itself, the process for downloading the data file and the linking application program file is omitted. Thus, an unnecessary downloading process can be avoided, and therefore the processing efficiency in the PDA 1 can be improved.

Further, the contents of the file data newly formed or updated as processed by the application process in the PDA 1 are transferred to the host PC 20 together with the location data of the hierarchical structure in the small capacity memory device 6 in the PDA 1, where the contents are stored. Thus, the process for updating the memory contents stored at the same location of the hierarchical structure in the large capacity storage device 26 of the host PC 20 is automatically performed. Therefore, the user can skip the operation for transmitting the updated data file to the host PC 20 for updating, and the operational efficiency for the application process can be further improved.

Next, another embodiment of the present invention will now be described with reference to drawings.

Second Embodiment

Figure 9A:
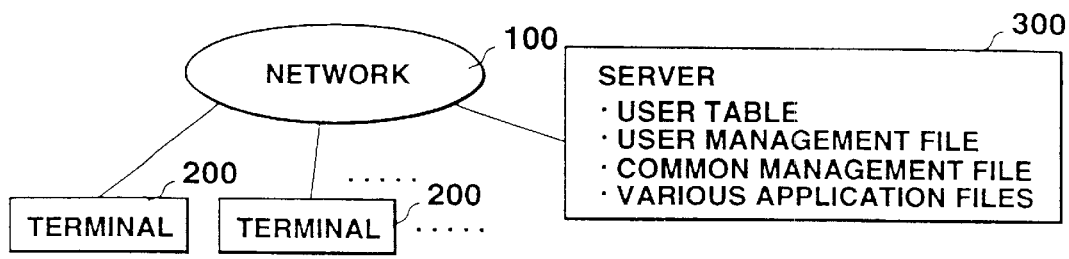
FIG. 9A is a diagram showing the entire structure of an information network according to a second embodiment of the data processing apparatus of the present invention.

FIG. 9A is a diagram illustrating the structure of a network system according to the second embodiment of the present invention. As can be seen in this figure, a plurality of network terminal devices 200 are coupled with a server 300 serving as a host device, via a network 100.

Figure 9B:
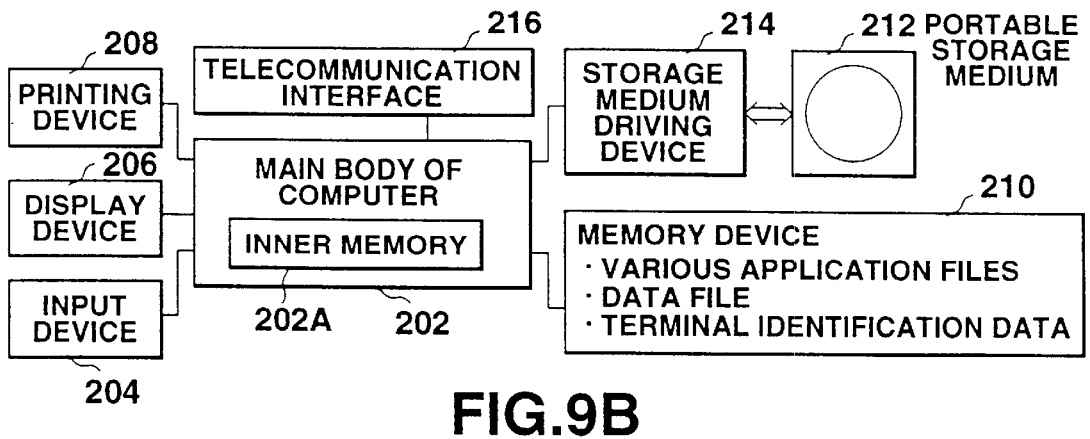
FIG. 9B is a diagram illustrating the structure of a network terminal device according to the second embodiment.

In this embodiment, each of the terminal devices 200 is a network personal computer (PC), which has a structure, for example, shown in FIG. 9B. In this figure, a computer main body 202 for controlling the entire system is shown, which includes an input device 204 such as a keyboard or mouse, a display device 206 such as a CRT, a printing device 208 such as a printer, and a memory device 210 such as a hard disk (HD), for storing data such as of an operating system (OS), device identification data for identifying a terminal device, various types of application program files and data files, program for initial download process, which will be later explained, and the like.

The computer main body 202 contains an internal memory 202A used as a work memory for executing programs stored in the memory device 210, and in the internal memory 202A, the above programs and other data are developed.

It should be noted that the memory device 210 is not of a type having a large capacity, and therefore, stores only the data for the OS or the download process which are stored in a portable recording medium 212 such as a floppy disk (FD) or CD-ROM and are read out by the recording medium driving device 214, or the data which are supplied from the server 300 on the network 100 via a communication interface 216. Other application program files or data files are downloaded from the server 300 as needed, to be stored in the memory device 210.

On the contrary, the server 300 employs a memory device having a large capacity, in which user tables, management files for individual users, common management files, various types of application program files and the like are stored. Programs for processes corresponding to a download request from the OS or each terminal device 200 are stored in the memory device in advance or as read out from a portable recording medium. The rest of the structure is the same as that of the terminal device 200.

Figure 9C:
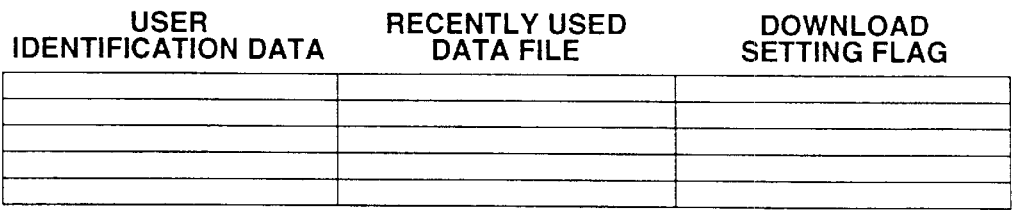
FIG. 9C is a diagram showing the structure of a user table.

FIG. 9C is a diagram showing a user table made for the server 300, and in the table, information indicating data files recently used (for example, latest ten files) by the user, is appropriately rewritten and stored so as to correspond to the user identification data such as a password, and further a download setting flag for indicating whether or not the data file arbitrarily set by the user from the terminal device 200 should be downloaded is stored.

Figure 9D:
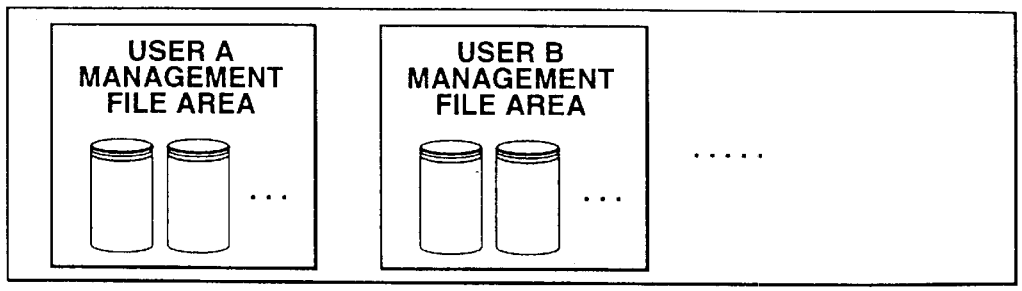
FIG. 9D is a diagram showing the structures of some of management files for individual users.

Similarly, the user management file set up in the server 300 contains management file areas for individual users as shown in FIG. 9D, and the contents of the data file used by each user and personal data such as mail data or schedule data are stored in the management file.

Next, the operation of the system having the above-described structure will now be described.

Figure 10:
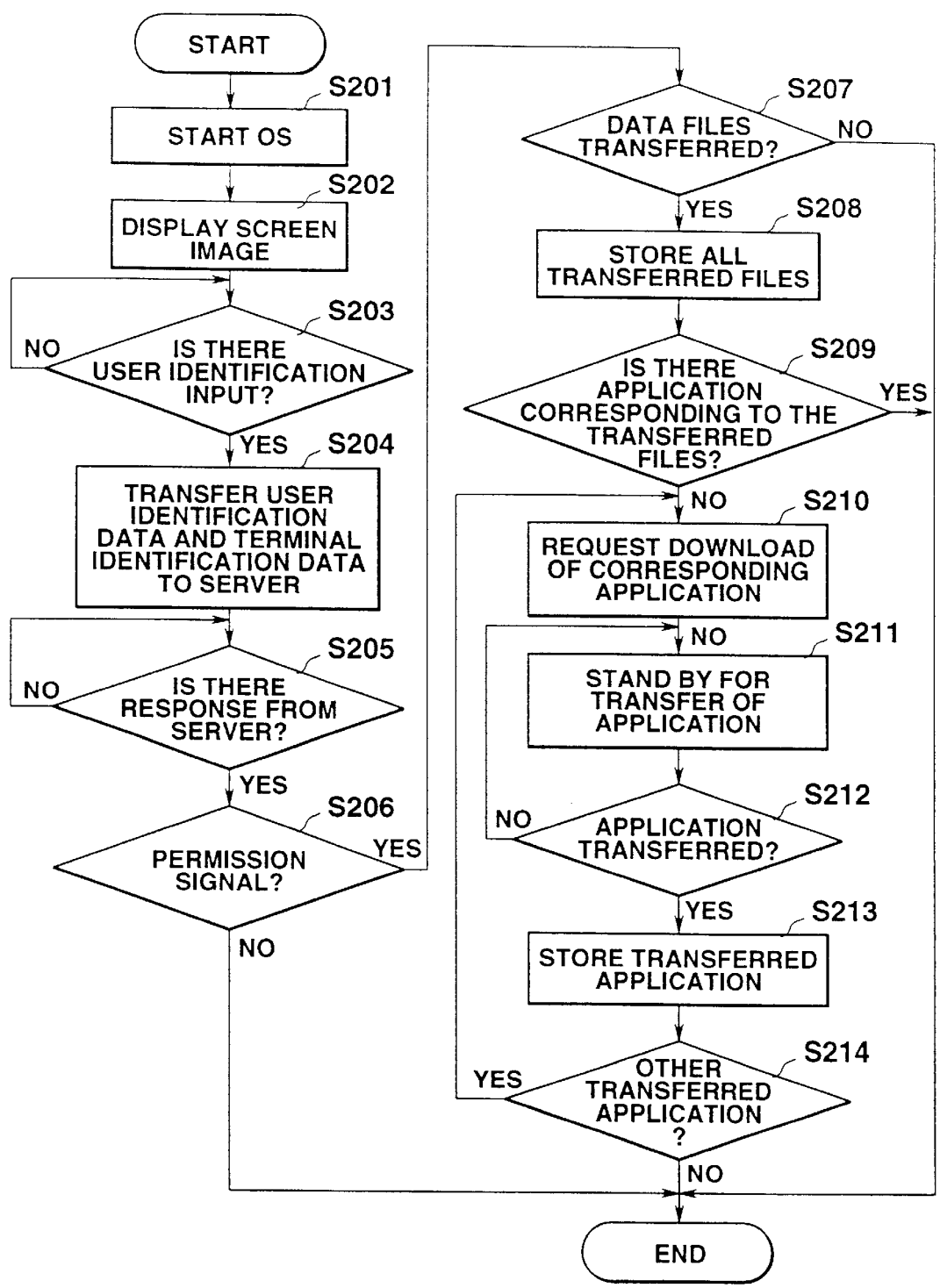
FIG. 10 is a flowchart illustrating the operation of the network terminal device in the second embodiment.
Figure 11:
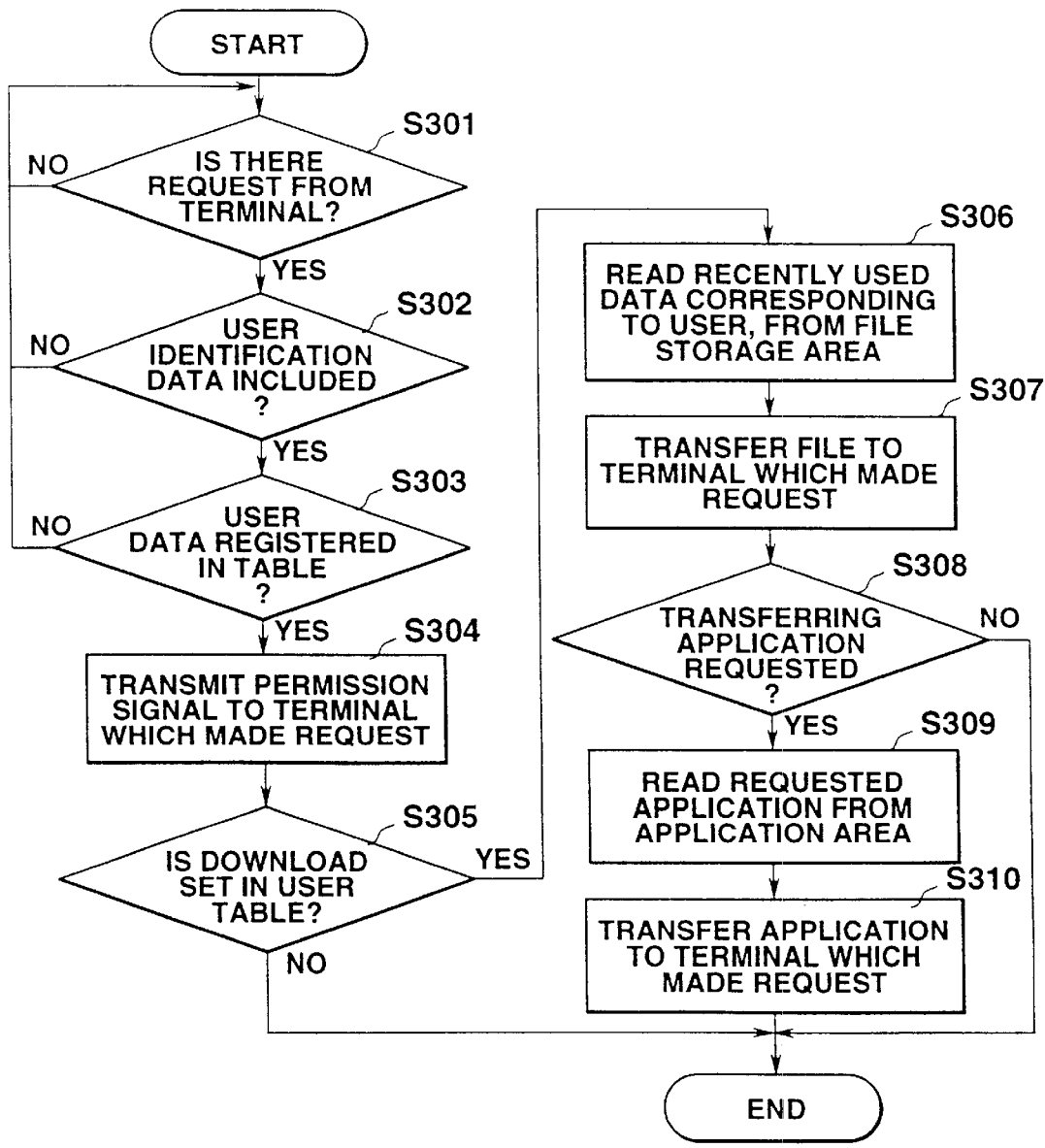
FIG. 11 is a flowchart illustrating the operation of the server as the host device in the second embodiment.

FIG. 10 is a flowchart of the initial download process carried out by the computer main body 202 of the network terminal device 200, and FIG. 11 is a flowchart illustrating the operation of the server 300, which corresponds to the above operation of the terminal device.

When the power of the network terminal device 200 is turned on, first the OS is started (step S201), and an initial screen image is displayed on the display device (step S202). Then, the terminal device 200 stands by for an input of a user identification data such as password, via the input device 204 (step S203).

When user identification data is input, a download request containing the user identification data and the terminal identification data of the terminal device 200, stored in the memory device 210, is transferred to the server 300 via the communication interface 216 (step S204), and the terminal 200 stands by for a response from the server 300 (step S205).

When the server 300 receives a download request from the terminal device 200 (step S301), the server 300 confirms whether or not user identification data is included in the request (step S302). When there is user identification data, it is determined whether or not the data coincides with any user data registered in the user table (step S303). When the data coincides any user data registered, the terminal device 200 which made the request is specified on the basis of the terminal identification data, and a permission signal is transferred to the terminal device 200 (step S304).

The terminal device 200, when a response is received from the server 300 via the communication interface 216, determines whether or not the response is the permission signal (step S206). If it is the permission signal, the step proceeds to the next; however if it is not the permission signal, the initial download process is ended. In the case where a permission signal is received, it is determined whether or not the data file is transferred (step S207).

After the transfer of a permission signal, whether or not the download setting is carried out, is determined by the server 300 with reference to the download setting flag for the user, set in the user table. When the download is not set, the process corresponding to the download request is ended. By contrast, when the download is set, the data file recently used is read out from the management file area of the user management file, which is used for the user, on the basis of the data file information recently used and corresponding to the user, stored in the user table (step S306). Then, the read data file is transferred to the terminal device 200 which made the request (step S307).

In the terminal device 200, when data files are not transferred, the initial download process is ended, whereas when data files are transferred, all the data files transferred are stored in the memory device 210 (step S208). After that, it is determined whether or not the corresponding application program file necessary for using the stored data files, is stored in the memory device 210 (step S209). When there is the corresponding application program file, the initial download process is ended. On the other hand, when there is no corresponding application program file, a request for downloading the corresponding application program file is made to the server 300 via the communication interface 216 (step S210), and the terminal device 200 is set in a standby state for the transfer of the application (step S211).

After the completion of the transfer of the data file, the server 300 determines whether or not there is a request of transferring an application program file, made by the terminal device 200 (step S308). When there is no such a request, the process corresponding to the download request is ended, whereas when there is such a request, the requested application program file is read out from the application area (step S309) and transferred to the terminal device 200 which made the request (step S310). Then, the process corresponding to the download request is ended.

When the terminal device 200 receives the corresponding application program file transferred, the received file is stored in the memory device 210 (step S213). Then, whether or not it is necessary to transfer the application program file corresponding to another data file, is determined (step S214). When it is necessary, the step returns to step S210, and when it is not, the initial download process is ended.

As described above, according to the network system in which the server 300 and the network terminal devices 200 are coupled on the network 100, the download request with the identification data unique to the user is transferred to the server 300 when starting the network terminal device 200. Further, the server 300 selects a predetermined file designated in advance from various files stored in the server and corresponding to the user of the identification data, and downloads the file to the network terminal device 200 which made the request. Therefore, the user need not at all to carry out the download process of a necessary file from the server 300 each time a request is issued.

Further, in downloading data files, recently used data files are automatically selected and downloaded, and therefore the user need not to carry out the operation for selecting a data file to be downloaded.

In place of storing the data for specifying data files recently used by the user, in the user table, it is also possible to store the data for specifying applications recently used by the user. Therefore, in downloading applications, recently used applications are automatically selected and downloaded, and therefore the user need not to carry out the operation for setting which application program file to be downloaded. Further, it is also possible to store the data for specifying both the data files and the applications recently used by the user.

Third Embodiment

Next, the third embodiment of the present invention will now be described.

Figures 12A, 12B, 12C:
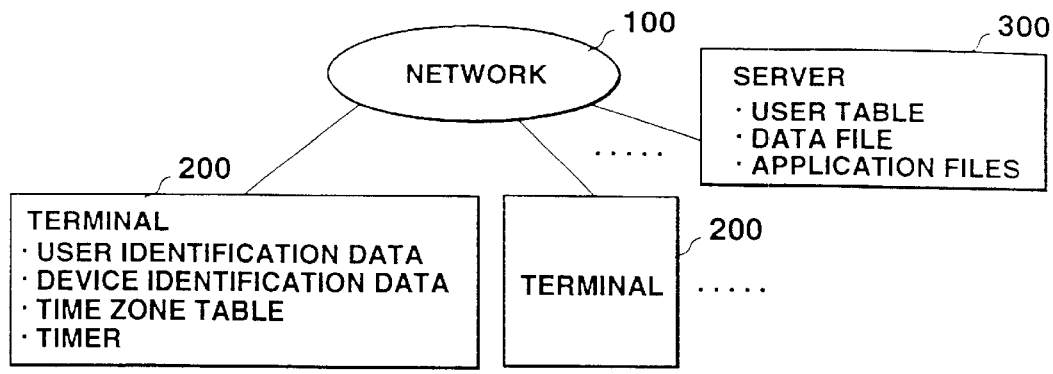
FIG. 12A is a diagram showing the entire structure of an information network according to a third embodiment of the data processing apparatus of the present invention.
FIG. 12B is a diagram illustrating the structure of a table used for individual users.
FIG. 12C is a diagram showing the structure of a time zone table.

FIG. 12A is a diagram showing the structure of a network system according to the third embodiment of the present invention, in which a plurality of network terminal devices 200 are coupled with a server 300 serving as a host device, via a network 100, as in the first embodiment. The structures of the terminal devices 200 and the server 300 are similar to those of the first embodiment, except for the followings. That is, in this embodiment, each terminal device 200 stores user identification data, device identification data and time zone table in its memory device. Further, the terminal device 200 has a timer which measures time and starts the terminal device 200 at a predetermined time. Further, the server 300 stores a table for individual users, data files and application program files in its memory device.

FIG. 12B is a diagram showing the table for individual users, set in the server 300, and in the table, the data for specifying the data file and application program file to be downloaded initially in response to the user identification data are stored. It should be noted that the table for individual users may be set in the terminal device 200 side.

FIG. 12C is a diagram showing a time zone table set in the terminal device 200, and in this table, the time for carrying out the download, arbitrarily set by the user, and the data for specifying the data file and application program file to be downloaded, are stored together with the data for specifying the application program file to be deleted.

Figure 13:
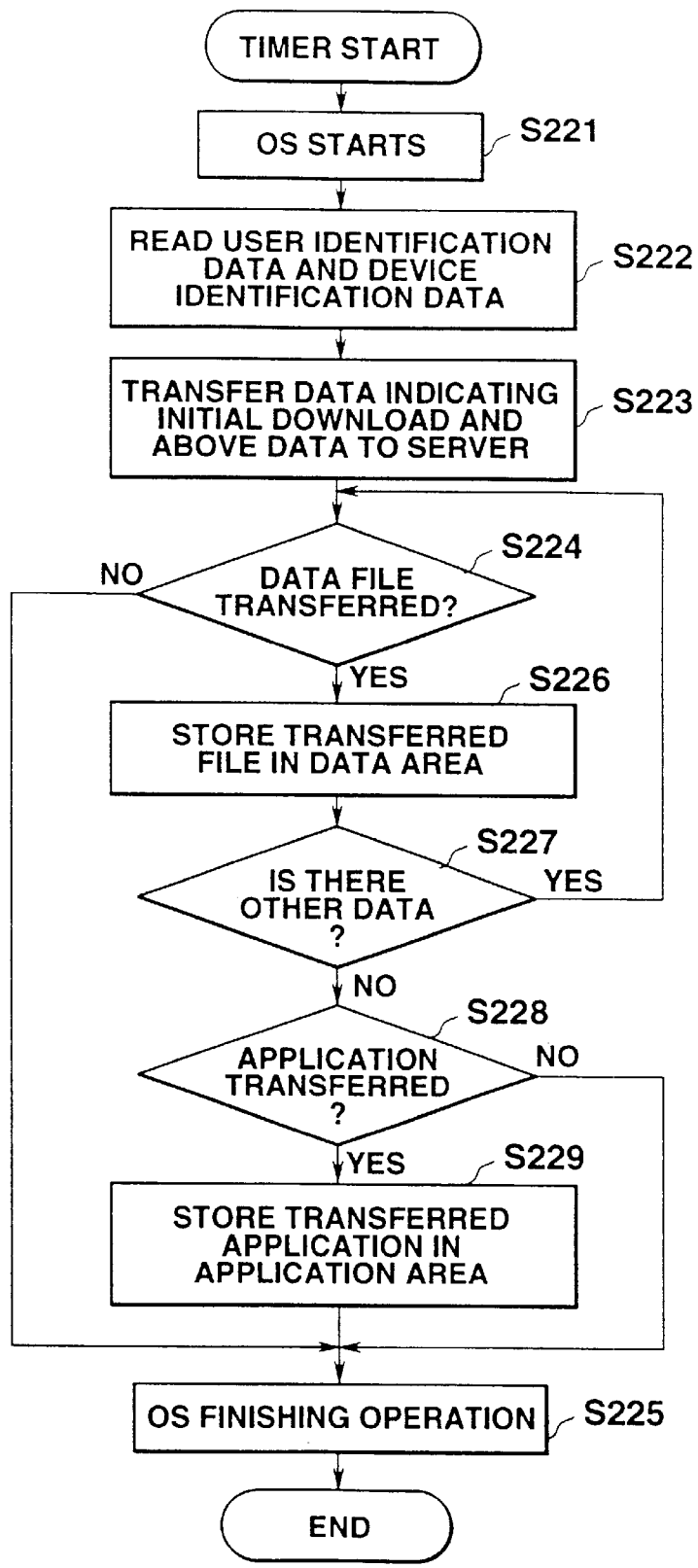
FIG. 13 is a flowchart illustrating the operation of the network terminal device when starting the timer in the third embodiment.

FIG. 13 is a flowchart illustrating the operation of the terminal device 200 started by the timer.

At a preset time, the OS starts (step S221), the user identification data and terminal identification data stored in the memory device are read out (step S222), and a download request containing the data indicating the initial start download and the data read out, is transferred to the server 300 (step S223).

Figure 14:
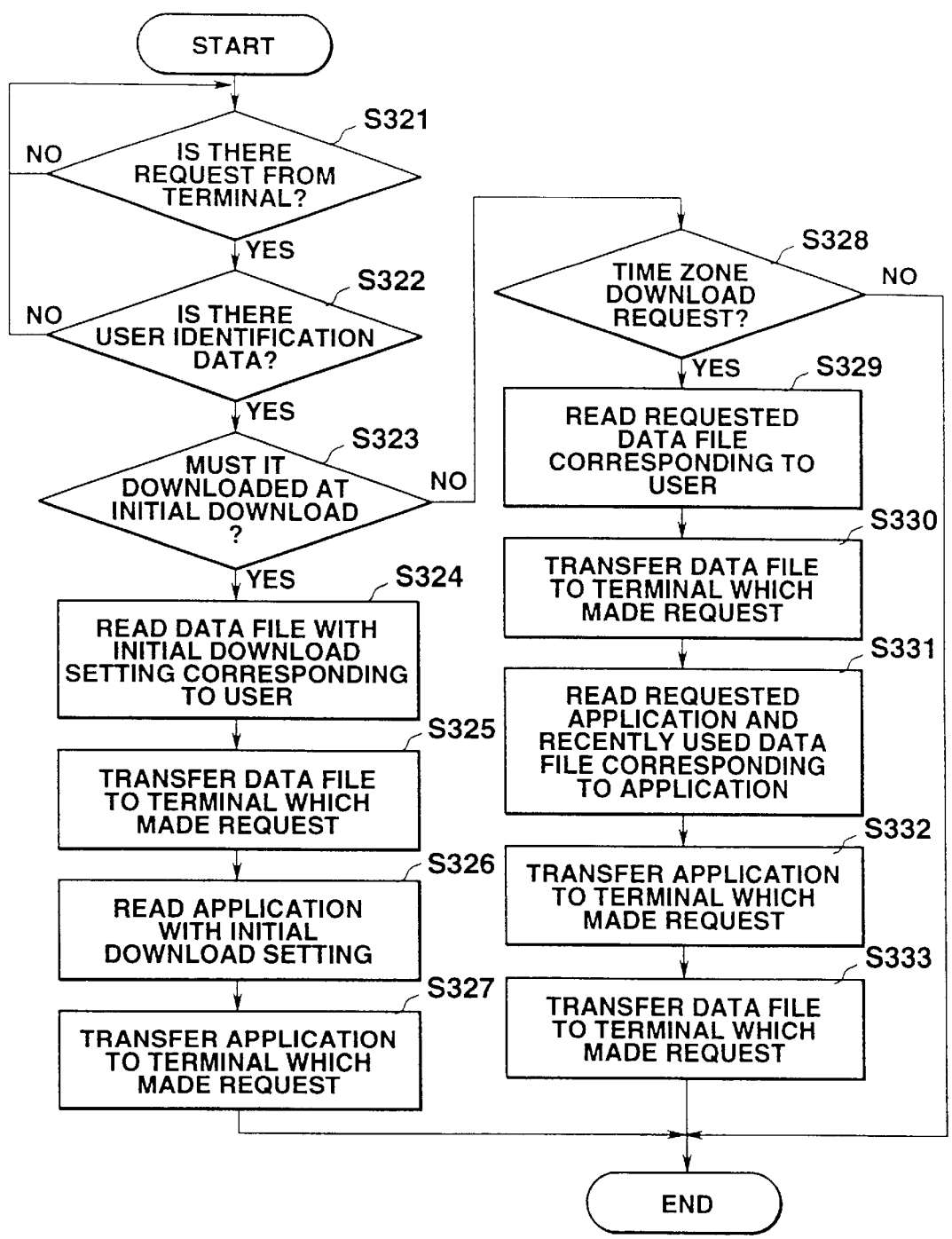
FIG. 14 is a flowchart illustrating the operation of the server as the host device in the third embodiment.

FIG. 14 is a flowchart illustrating the operation of the server 300. As shown in the flowchart, when a download request is received from the terminal device 200 (step S321), it is, first, determined if user identification data is included (step S322). If there is such data, it is then determined whether or not the download request is made at the time of the initial start download (step S323). If the download request is determined to be made at the time of the initial start download, the data file is read out from the memory device in accordance with the data file information of the initial download setting, which corresponds to the user identification data of the user table (step S324), so as to specify the terminal device 200 which made the request on the basis of the terminal identification data, and the data file read out is transferred to the terminal device 200 (step S325).

The terminal device 200 stands by for the transfer of the data file for a given time period. In the case where there is no data file transferred within that time period (step S224), the OS finishing operation is carried out (step S225) to finish the process. On the other hand, in the case where there is a data file transferred within the given time period (step S224), the transferred file is stored in the memory device (step S225).

Similarly, after the transfer of the data file, the server 300 reads the application program file from the memory device in accordance with the application data of the initial download setting, which corresponds to the user identification data of the user table (step S326), and the data file read out is transferred to the terminal device 200 which made the request (step S327). Thus, the process is ended.

After storing the data file, the terminal device 200 stands by for the transfer of the application program file for a given time period. In the case where there is no application program file transferred within that time period (step S228), the process proceeds to step S225. On the other hand, in the case where there is an application program file transferred within the given time period, the transferred application program file is stored in the memory device (step S229). Then, the process proceeds to step S225, and the OS finishing operation is carried out to finish the process.

Figure 15:
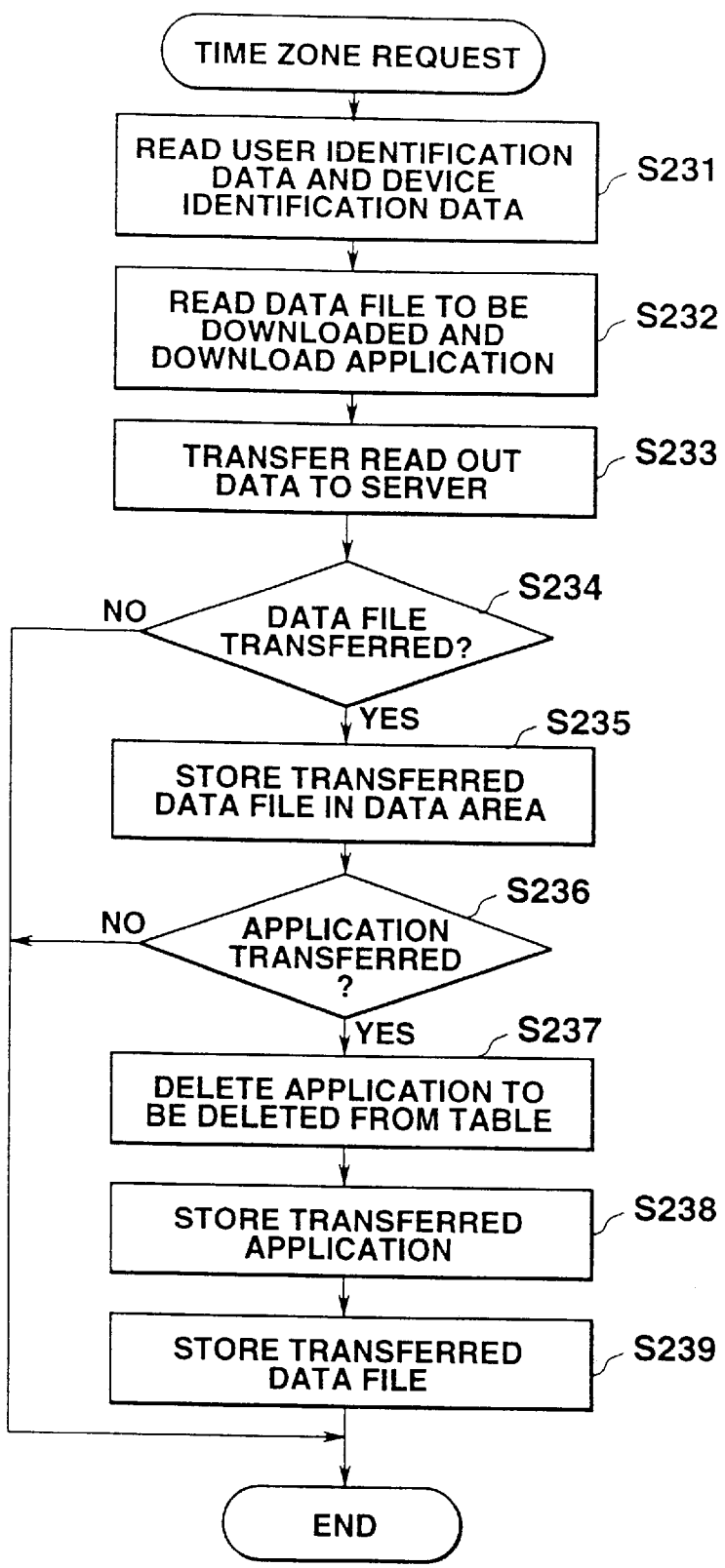
FIG. 15 is a flowchart illustrating the operation of a download request process for individual time zone, by the network terminal device in the third embodiment.

Next, when the time set as the download time in the time zone table comes, an interruption occurs to the computer main body of the terminal device 200, and the process shown in FIG. 15 is executed.

More specifically, first, the user identification data and terminal identification data stored in the memory device are read (step S231), and further the data indicating the data file and application program file to be downloaded, which corresponds to the preset time, are read out from the time zone table (step S232). Then, the download request which contains the data indicating the time zone download, and the read-out data is transferred to the server 300 (step S233).

When the server 300 determines that the download request is not for the initial start download in step S323, it further determines whether or not the download request received is a time zone download request (step S328). When it is not a time zone download request, the process is ended; however when it is a time zone download request, the data file request is read out from the memory device (step S329), and transferred to the terminal device 200 which made the request (step S330).

The terminal device 200 stands by for the transfer of the data file for a given time period. In the case where there is no data file transferred within that time period (step S234), the process is ended. On the other hand, in the case where there is a data file transferred within the given time period, the transferred file is stored in a data area of the memory device (step S235).

After the transfer of the data file, the server 300 reads the requested application program file from the memory device, together with the recently used data file corresponding to the application as in the first embodiment (step S331). Then, the application program file and data file read out are transferred to the terminal device 200 which made the request (steps S332 and S333). Thus, the process is ended.

After storing the data file, the terminal device 200 stands by for the transfer of the application program file for a given time period. In the case where there is no application program file transferred within that time period (step S236), the process is ended. On the other hand, in the case where there is an application program file transferred within the given time period, after ensuring an enough area in the memory device by deleting the application program file designated by the delete application data in the time zone table (step S237), the transferred application program file is stored in the memory device (step S238). Then, the data file recently used, and corresponding to the application program file transferred next, is stored in the memory device (step S239), and the process is ended.

As described above, in this embodiment, the data file or application program file preset to be started by the timer is automatically downloaded, and therefore the necessary data file and application program file are already downloaded at the time when the user actually starts the terminal device 200. Thus, the process can be carried out immediately after starting the device.

Further, the data files and applications to be downloaded are set in time zones, and therefore only the necessary data file or application for a particular time zone can be automatically downloaded (for example, in the case where a certain application is needed in the afternoon though it is not necessary in the morning). Thus, the necessary data file or application can be surely used in the necessary time zone.

When an application is automatically downloaded, the data file recently used in connection with the application is also automatically downloaded, and therefore the data file can be directly accessed.

Several embodiments of the present invention have been described so far; however the present invention is not limited to these embodiments, and it is only natural that the invention can be modified into various versions and applications as long as the essence remains within the range of the invention.

For example, in the second embodiment, the terminal device 200 is started by the timer of itself however it is also possible that the time is monitored by the server 300 side, and when the start time comes, the power of the terminal device 200 is turned on by the server 300 via the network 100, to start the device.

Further, in the second embodiment, the download time is set in the time zone table, and the process shown in FIG. 15 is automatically executed when the preset time comes. However, in place of determining the download time univocally, it is also possible that a download request can be made at a desired time, and the time when the request is made is determined to which time zone the request time belongs. Thus, the file is read on the basis of the file designation data set for that particular time zone, and the file is transmitted to the server 300.

Further, in place of setting the time zone table on the terminal device 200 side, it is also possible that the table is provided on the server 300 side, and in the case where the download time comes or a request is made from a terminal device 200, the file is read on the basis of the file designation data set for that particular time zone, and the file is transmitted to the terminal device 200.

According to the above described embodiments, in the case where a desired indication item is selected from a plurality of indication items displayed on the display screen, and a file corresponding to the selected indication item is not stored in the memory means, a file corresponding to the selected indication item is downloaded automatically from the host device. Therefore, the process of the file can be immediately carried out.

Furthermore, since the data file downloaded by the selection of the identification item is immediately opened, the process of the file can be immediately carried out.

In the case where there is no application program file corresponding to the data file when the data file is downloaded, the application program file of the application is downloaded immediately, the data processing on the basis of the data file can be immediately carried out.

In the case where there is a file downloaded from the host device, the presence of the file can be determined at once.

Further, a plurality of indication data related to various types of files stored in the host device are received from the host device to be displayed, and therefore a file corresponding to a desired indication data can be immediately downloaded by confirming files which can be downloaded from the host device, with the indication item displayed on the display screen.

Further, since a particular file is automatically downloaded regardless of an instruction from the operator, during indication data are acquired, the process of the downloaded file can be immediately carried out.

Furthermore, since substantially the same display state as that of the host device is reproduced automatically in the terminal device, the operation can be carried out without feeling a sense of difference from the operational environment for the host device.

In the network terminal device to be connected to a host device, according to the present invention, user identification data is notified to the host device and a file extracted on the basis of the user identification data on the host device side, is automatically received by the terminal device, and therefore the user can obtain the file necessary for the user immediately, to process it.

Further, since the notification is automatically carried out to the host device at the time of starting the network terminal device, the user does not have to be concerned with the download of the file from the host device. Also, of a great number of files corresponding to the user, only the selected one of them can be obtained automatically to process it.

Furthermore, in the present invention, the network terminal device is automatically started by a timer and a necessary file is automatically received from the host device to be stored, and therefore, in the case where the timer start time is set at the time before the user actually operates the device, the necessary file is already stored when the user starts the operation of the terminal device. Thus, the process can be immediately carried out.

Also, of a great number of files corresponding to the user, only the selected one of them can be obtained automatically to process it.

Further, when extracting a file to be transmitted, from various types of files stored in the host device side, the file corresponding to that time zone with reference to the present time, is extracted, and thus the extracted file is transmitted to the terminal device. Therefore, only the file necessary for a particular time zone, is automatically downloaded, and the process of the file can be carried out.

Furthermore, since the time zone memory means is prepared, the setting or revision of data can be easily carried out. Also, the file indication data for specifying an unnecessary file for each time zone is stored, and therefore the unnecessary file can be automatically deleted.

INDUSTRIAL APPLICABILITY

According to the present invention, there is provided a data processing apparatus capable of downloading a necessary file from the host device connected via a communication network and immediately process the file thus downloaded.

What is claimed is:

1. A network terminal for communicating with a host computer via a communication channel, comprising:
    a memory configured to store a plurality of application files and a plurality of data files;
    an initial setting unit configured to communicate with the host computer, download a display screen setting information and a menu of file names of data files and application files stored in the host computer, and to set a display mode based on the downloaded display screen setting information so as to make an operating environment of the terminal equal to an operating environment of the host computer;
    a menu display configured to display the downloaded menu of file names under the set display mode;
    a determination unit configured to determine whether the memory stores a file whose name is designated by a user on the displayed menu and whether the designated file is an application file or a data file;
    a first download unit, if the designated file is an application file and is not stored in the memory, configured to download the designated file from the host computer, extract, based on the designated file, a plurality of data files which were recently used by the designated file and stored in the host computer, and download the extracted data files from the host computer;
    a second download unit, if the designated file is a data file and is not stored in the memory, configured to download the designated data file from the host computer and, if an application file corresponding to the designated file is not stored in the memory, configured to download the application file corresponding to the designated file from the host computer; and
    an upload unit configured to execute the designated application file or the application file corresponding to the designated data file, update a data file corresponding to the executed application file, and upload the updated data file to the host computer.

2. The network terminal according to claim 1, further comprising:
    an icon display configured to display an icon indicating an application file which has been downloaded in file names displayed in the menu.

3. A system including a host computer and a network terminal capable of communicating with the host computer via a communication channel, comprising:
    a first memory configured to store an initial table of a file information indicating files to be downloaded from the host computer to the network terminal at an initial stage of operation of the network terminal;
    a second memory configured to store a time zone table of a file information indicating files to be used in respective time zones;

an initial download unit configured to cause the network terminal to communicate with the host computer at the initial stage of operation of the network terminal and cause the host computer to read files designated by the initial table and to download the read files to the network terminal; and a time zone download unit configured to cause the network terminal to communicate with the host computer at each of the time zones and cause the host computer to read files designated by the time zone table and to download the read files to the network terminal, the time zone download unit including an extraction unit, if the file indicated by the time zone table is an application file, configured to cause the host computer to extract, based on the application file, a plurality of data files which were recently used by the indicated application file, and to download the extracted data files to the network terminal.

4. The system according to claim 3, wherein said second memory stores unnecessary file information indicating unnecessary files for each time zone, and which further comprises a deletion unit configured to delete unnecessary files indicated by the unnecessary file information for each time zone.

5. An article of manufacture including a computer usable medium having computer readable program code means embodied therein, the computer readable program code means in said article of manufacture comprising:

computer readable program code means for causing a computer to store a plurality of application files and a plurality of data files;

computer readable program code means for causing a computer to communicate with a host computer, download a display screen setting information and a menu of file names of data files and application files stored in the host computer, and to set a display mode based on the downloaded display screen setting information so as to make an operating environment of the terminal equal to an operating environment of the host computer;

computer readable program code means for causing a computer to display the downloaded menu of file names under the set display mode;

computer readable program code means for causing a computer to determine whether or not the memory stores a file whose name is designated by a user on the displayed menu and whether the designated file is an application file or a data file;

computer readable program code means for causing a computer, if the designated file is an application file and is not stored in the memory, to download the designated file from the host computer, extract, based on the designated file, a plurality of data files which were recently used by the designated file and stored in the host computer, and download the extracted data files from the host computer;

computer readable program code means for causing a computer, if the designated file is a data file and is not stored in the memory, to download the designated data file from the host computer and, if an application file corresponding to the designated file is not stored in the memory, to download the application file corresponding to the designated file from the host computer; and computer readable program code means for causing a computer to execute the designated application file or the application file corresponding to the designated data file, update a data file corresponding to the executed application file, and upload the updated data file to the host computer.

6. An article of manufacture including a computer usable medium having computer readable program code means embodied therein, the computer readable program code means in said article of manufacture comprising:

computer readable program code means for causing a computer to store an initial table of file information indicating files to be downloaded from the host computer to the network terminal at an initial stage of operation of the network terminal;

computer readable program code means for causing a computer to store a time zone table of a file information indicating files to be used in respective time zones;

computer readable program code means for causing a computer configured to cause the network terminal to communicate with the host computer at the initial stage of operation of the network terminal and to cause the host computer to read files designated by the initial table and to download the read files to the network terminal; and computer readable program code means for causing a computer to cause the network terminal to communicate with the host computer at each of the time zones and to cause the host computer to read files designated by the time zone table and to download the read files to the network terminal, the time zone download unit including an extraction unit, if the file indicated by the time zone table is an application file, configured to cause the host computer to extract, based on the application file, a plurality of data files which were recently used by the indicated application file, and to download the extracted data files to the network terminal.

* * * * *